(12) United States Patent
Buerkle et al.

(10) Patent No.: US 12,012,043 B2
(45) Date of Patent: Jun. 18, 2024

(54) INTERIOR REARVIEW MIRROR SYSTEM WITH AMBIENT LIGHT DETECTION

(71) Applicant: Magna Mirrors of America, Inc., Holland, MI (US)

(72) Inventors: Austin T. Buerkle, Grand Rapids, MI (US); Rodney K. Blank, Zeeland, MI (US); John T. Uken, Jenison, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 289 days.

(21) Appl. No.: 17/301,774

(22) Filed: Apr. 14, 2021

(65) Prior Publication Data

US 2021/0316663 A1 Oct. 14, 2021

Related U.S. Application Data

(60) Provisional application No. 63/198,617, filed on Oct. 30, 2020, provisional application No. 63/009,551, filed on Apr. 14, 2020.

(51) Int. Cl.
| | |
|---|---|
| *B60R 1/08* | (2006.01) |
| *B60R 1/12* | (2006.01) |
| *G01J 1/42* | (2006.01) |
| *B60R 1/02* | (2006.01) |

(52) U.S. Cl.
CPC .............. *B60R 1/083* (2013.01); *B60R 1/088* (2013.01); *B60R 1/12* (2013.01); *G01J 1/4204* (2013.01); *B60R 1/02* (2013.01); *B60R 2001/1223* (2013.01); *B60R 2001/1253* (2013.01)

(58) Field of Classification Search
CPC .......... B60R 1/083; B60R 1/088; B60R 1/12; B60R 1/02; B60R 2001/1223; B60R 2001/1253; G01J 1/4204; G01J 1/26
USPC ........................................................ 359/603
See application file for complete search history.

(56) References Cited

U.S. PATENT DOCUMENTS

| | | | |
|---|---|---|---|
| 5,066,112 A | 11/1991 | Lynam et al. | |
| 5,140,455 A | 8/1992 | Varaprasad et al. | |
| 5,151,816 A | 9/1992 | Varaprasad et al. | |
| 5,253,109 A | 10/1993 | O'Farrell et al. | |
| 5,530,240 A | 6/1996 | Larson et al. | |
| 6,172,613 B1 * | 1/2001 | DeLine .................... | B60R 1/04 359/872 |

(Continued)

*Primary Examiner* — Balram T Parbadia
*Assistant Examiner* — Rahman Abdur
(74) *Attorney, Agent, or Firm* — HONIGMAN LLP

(57) ABSTRACT

A vehicular interior rearview mirror system includes an interior rearview mirror assembly having a mirror head adjustably mounted at a mounting structure. The mirror head includes a mirror casing and an electro-optic variable reflectance mirror reflective element. A glare light sensor senses glare light emanating from headlights of another vehicle rearward of the equipped vehicle. An ambient light sensor senses ambient light at the vehicle. The ambient light sensor comprises part of a rain sensing device disposed at an in-cabin side of a windshield of the vehicle. Mirror control circuitry is operable to adjust dimming of the mirror reflective element responsive to an output from the glare light sensor and an output from the ambient light sensor. Responsive to the output from the glare light sensor and the output from the ambient light sensor, the mirror control circuitry controls dimming of the mirror reflective element.

23 Claims, 1 Drawing Sheet

(56) References Cited

U.S. PATENT DOCUMENTS

| | | |
|---|---|---|
| 6,313,454 B1 * | 11/2001 | Bos ............... G06V 20/56 250/208.1 |
| 6,353,392 B1 | 3/2002 | Schofield et al. |
| 6,439,755 B1 | 8/2002 | Fant, Jr. et al. |
| 6,449,082 B1 | 9/2002 | Agrawal et al. |
| 6,501,387 B2 | 12/2002 | Skiver et al. |
| 6,690,268 B2 | 2/2004 | Schofield et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,626,749 B2 | 12/2009 | Baur et al. |
| 8,049,640 B2 | 11/2011 | Uken et al. |
| 8,277,059 B2 | 10/2012 | McCabe et al. |
| 8,508,831 B2 | 8/2013 | De Wind et al. |
| 8,529,108 B2 | 9/2013 | Uken et al. |
| 8,629,768 B2 | 1/2014 | Bos et al. |
| 8,730,553 B2 | 5/2014 | De Wind et al. |
| 9,126,525 B2 | 9/2015 | Lynam et al. |
| 9,346,403 B2 | 5/2016 | Uken et al. |
| 9,565,342 B2 | 2/2017 | Sauer et al. |
| 9,598,016 B2 | 3/2017 | Blank et al. |
| 9,878,669 B2 | 1/2018 | Kendall |
| 10,466,563 B2 | 11/2019 | Kendall et al. |
| 10,484,587 B2 | 11/2019 | Conger |
| 11,242,008 B2 | 2/2022 | Blank et al. |
| 11,318,888 B2 | 5/2022 | Uken |
| 2004/0217266 A1 * | 11/2004 | Bechtel ............. G01J 1/0403 250/215 |
| 2009/0143936 A1 * | 6/2009 | Craig ............... B60W 40/02 701/37 |
| 2012/0236388 A1 | 9/2012 | De Wind et al. |
| 2013/0338882 A1 * | 12/2013 | Baur ............... B60R 1/12 701/36 |
| 2014/0275850 A1 * | 9/2014 | Venkatraman ..... A61B 5/02427 600/595 |
| 2014/0313563 A1 | 10/2014 | Uken et al. |
| 2015/0097955 A1 | 4/2015 | De Wind et al. |
| 2015/0334354 A1 | 11/2015 | Uken et al. |
| 2019/0047475 A1 | 2/2019 | Uken et al. |
| 2019/0106059 A1 | 4/2019 | Wesley et al. |
| 2019/0258131 A9 | 8/2019 | Lynam et al. |

\* cited by examiner

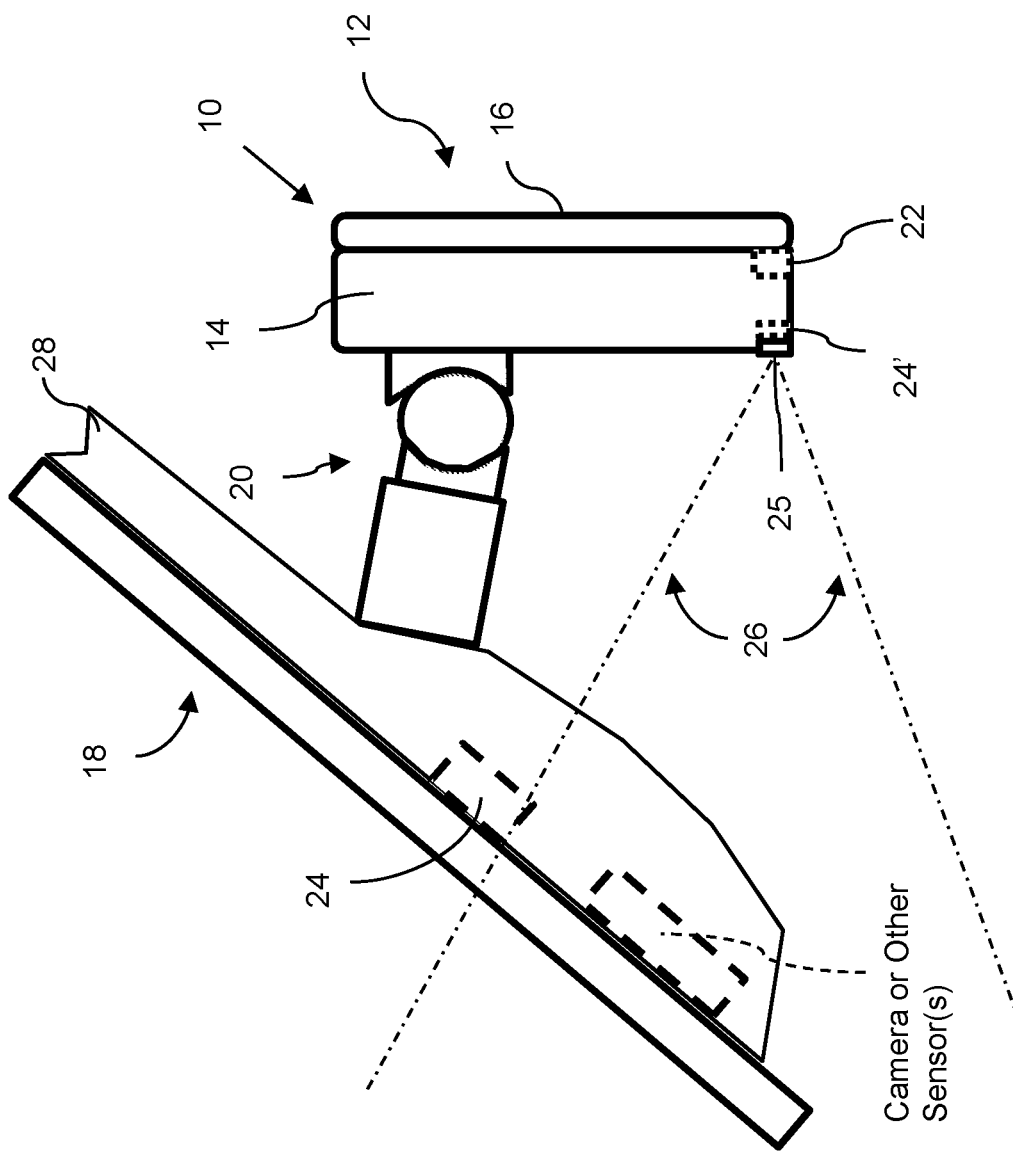

INTERIOR REARVIEW MIRROR SYSTEM WITH AMBIENT LIGHT DETECTION

CROSS REFERENCE TO RELATED APPLICATIONS

The present application claims the filing benefits of U.S. provisional applications, Ser. No. 63/198,617, filed Oct. 30, 2020, and Ser. No. 63/009,551, filed Apr. 14, 2020, which are hereby incorporated herein by reference in their entireties.

FIELD OF THE INVENTION

The present application relates generally to the field of interior rearview mirror assemblies for vehicles.

BACKGROUND OF THE INVENTION

It is known to provide a mirror assembly that is adjustably mounted to an interior portion of a vehicle, such as via a single or double ball pivot or joint mounting configuration where the mirror casing and reflective element are adjusted relative to the interior portion of a vehicle by pivotal movement about the pivot configuration. It is also known to provide an electro-optic variable reflectance mirror reflective element at an interior rearview mirror assembly, whereby the reflective element dims responsive to ambient light at the vehicle and glare light from rearward of the vehicle. The ambient light sensor and the glare light sensor are located at the interior rearview mirror head.

SUMMARY OF THE INVENTION

An interior rearview mirror system includes an interior rearview mirror assembly having a mirror reflective element (such as an electro-optic variable reflectance mirror reflective element) that is responsive to an ambient light level and a glare light level (and optionally including a display or video display screen that is responsive to the ambient light level). The ambient light level is determined by a separate sensor disposed remote from the mirror head of the mirror assembly, such as at the in-cabin side of the vehicle windshield. Optionally, the ambient light level may be determined by a light sensor of a rain sensing device (or rain, light, humidity multipurpose sensor) disposed at the in-cabin side of the windshield, where the data output by the rain light sensor may be provided to the dimming control circuitry for the mirror reflective element via a LIN (Local Interconnect Network) communication bus of the vehicle or the like. Optionally, the ambient light level may be determined via processing image data captured by a forward viewing camera disposed at the in-cabin side of the windshield and viewing through the windshield. Optionally, the ambient light level may be determined by a light sensor disposed at the mirror head and behind a light collecting lens that is disposed at and at least partially across or along a lower region of the mirror head, where the light collecting lens may function as a visible indicator that is viewable at least when an indicator light source at the mirror head and behind the light collecting lens is actuated.

Therefore, the interior rearview mirror system provides for ambient light determination via a remote sensor or a sensor along the lower region of the mirror head. This provides ambient light sensing at an area that is not often blocked or occluded by components (such as a forward viewing camera module or windshield electronics module or accessory module and/or the like) and darkening layers disposed at the in-cabin side of the windshield at or near the location where the interior rearview mirror assembly is mounted.

These and other objects, advantages, purposes and features of the present invention will become apparent upon review of the following specification in conjunction with the drawings.

BRIEF DESCRIPTION OF THE DRAWINGS

FIG. 1 is a side view of an interior rearview mirror assembly disposed at an in-cabin side of a windshield with an accessory module disposed at the windshield forward of the mirror head.

DESCRIPTION OF THE PREFERRED EMBODIMENTS

Referring now to the drawing and the illustrative embodiment depicted therein, an interior rearview mirror assembly 10 for a vehicle includes a mirror head 12 (comprising a mirror casing 14 and a reflective element 16 positioned at a front portion of the casing 14) that is adjustably mounted at an interior portion of a vehicle (such as to an interior or in-cabin surface of a vehicle windshield 18 or a headliner of a vehicle or the like) via a mounting structure or mounting configuration or assembly 20. The mirror reflective element comprises a variable reflectance mirror reflective element that varies its reflectance responsive to electrical current applied to conductive coatings or layers of the reflective element.

The mirror reflective element may optionally comprise a display element, such as a backlit liquid crystal display (LCD) video display screen backlit by a plurality of light emitting elements and capable of varying its brightness or intensity such as via intelligent dimming. The display element is operable to display video images derived from a rearward viewing camera of the vehicle (such as part of a camera monitoring system (CMS) of the vehicle) and representative of a view rearward of the vehicle. The display element may be disposed in the mirror head instead of or in addition to the variable reflectance mirror reflective element. For example, the display element may be an integrated portion of a variable reflectance mirror reflective element where dimming/brightness of both portions may be controlled together or independent of one another. Thus, it should be understood that instances discussing the dimming of the reflective element may also be applicable to varying the brightness of a display element disposed behind the mirror reflective element and operating so as to be viewable through the reflective element, or in place of a mirror reflective element.

The reflective element 16 is operable to dim or darken via electro-optic dimming control circuitry that controls the dimming and reflectance of the reflective element responsive to a glare light sensor 22 that operates to detect glare light emanating from headlights of vehicles rearward of the equipped vehicle and trailing the equipped vehicle. The dimming control circuitry is further responsive to an ambient light sensor 24 that operates to sense or detect ambient light at the windshield. The dimming control circuitry may be disposed in the mirror head 12 or elsewhere at the vehicle such as at the mirror mount 20 or at a windshield electronics module 28 (which may house a camera, various other sensors, and the like, such as for an advanced driver assist system (ADAS)), whereby wiring from the circuitry is routed along and within the mounting arm to the mirror head.

The glare light sensor 22 may be located at the mirror head 12 with a rearward facing field of sensing so as to detect glare light emanating rearward of the equipped vehicle. The glare light sensor may be located behind the mirror reflective element or in other suitable locations on the vehicle for sensing light emanating rearward of the vehicle, such as at the rear windshield, the center high-mounted stop lamp (CHMSL), or integrated with a rear facing camera. The ambient light sensor may be located at the mirror head 12 with a frontward facing field of sensing so as to detect ambient light at the windshield. However, other components disposed at the windshield (such as a windshield electronics module 28) and/or darkening layers of the windshield can block or at least partially occlude the field of sensing of an ambient light sensor disposed at the mirror head 12.

The dimming control circuitry is operable responsive to an ambient light sensor, which may be disposed remote from the mirror head. This allows the ambient light sensor to be disposed at the in-cabin side of the windshield at or near the mirror head, such as at the windshield electronics module 28 or independently located at the windshield. By locating the ambient light sensor remote from the mirror head, the ambient light sensor is not disposed at the mirror head and is thus not blocked or occluded by other vehicle components (such as a forward viewing camera module or windshield electronics module or accessory module disposed at the in-cabin side of the windshield at or near where the interior rearview mirror is located) and/or a darkening layer or coating disposed at the windshield and forward of the mirror head.

The dimming control circuitry is also operable responsive to the glare light sensor 22, which detects light rearward of the vehicle (such as light emanating from headlights from other vehicles rearward of and following the equipped vehicle). The glare light sensor, as shown, is at the mirror head 12, but may be disposed in other locations within or exterior the vehicle suitable for detecting light rearward of the vehicle. For example, the glare light sensor may be disposed at or near a rear window of the vehicle, such as at a CHMSL of the vehicle. The glare light sensor may also be integrated or utilize features of other rear-viewing sensors of the vehicle such as a rear backup camera.

The sensor 24 used for sensing ambient light for the mirror dimming control circuitry may comprise a rain light sensor that is disposed at the windshield (or windshield electronics module) for sensing rain or precipitation at the windshield (for controlling the windshield wipers and interior lighting of the vehicle when precipitation is detected). Such a rain light sensor is part of and is integrated into a rain sensing device and provides data indicative of ambient light to the LIN bus (or other communication network) of the vehicle. For example, the rain sensing device may comprise a rain light sensor of the types commercially available from Hella GmbH & Co. Such a rain sensing device or rain-light sensor (e.g., a Rain-Light-Solar-Humidity-Display-Sensor or RLSHD-S) provides rain sensing and light sensing, where a light sensor senses ambient light over a large spatial angle forward and above the windshield of the vehicle.

The rain light sensor may be disposed at the in-cabin side of the windshield (such as at the windshield electronics module) to detect when it is raining (the greater the intensity of rain at the windshield, the less light reaches the light sensor or photodiode) and can transmit information to the windshield wipers' controller, such that the wiper frequency can be adapted responsive to the determined rain intensity. The sensor continually or episodically takes measurements so that windshield wiper intensity may be individually adapted to the amount of precipitations. The continuous or frequent measurements also enable continuous or frequent adjustment of the mirror dimming via use of the rain light sensor. The sensor may also determine ambient light levels for automatically switching the vehicle lighting on and off. The system may be operable to determine the spectral band of the light to distinguish between artificial light and daylight. The sensor may incorporate both an ambient (upward sensing or viewing) sensor and a forward light (forward sensing or viewing) sensor. The ambient light sensor collects and senses light from as wide a field of sensing as possible without emphasizing any one direction in particular. The forward light sensor collects and senses light directed in front of the vehicle and may include a receiving characteristic especially adapted to collect and direct light from forward the vehicle to the forward light sensor. Thus, the rain light sensor may be capable of determining light levels from the ambient light sensor and the forward light sensor, either independently or in combination with one another. The sensitivity of the sensors may be coarse, such as about 20 lux minimum.

The mirror dimming control circuitry may also be connected to or in communication with the LIN bus and may receive the data output by the rain light sensor to determine ambient lighting levels at the vehicle for use in controlling the dimming of the mirror reflective element and/or brightness of the display element. The mirror dimming control circuitry controls dimming of the reflective element (and/or display brightness) responsive to the provided ambient light data and the glare light data output by the glare light sensor of the mirror (or glare light data output by a rearward viewing camera of the vehicle, such as a rear backup camera or a camera mounted at or near the CHMSL of the vehicle).

Optionally, the ambient light data may be provided from another light sensor disposed at the windshield and remote from the mirror head, such as a stand-alone ambient light sensor or a light sensor that is part of another sensing device or component disposed at the windshield (and optionally a light sensor disposed at the mounting base of the mirror mount). Optionally, the ambient light data may be provided by the forward viewing windshield-mounted camera (or by a rearward viewing camera of the vehicle), such as by utilizing aspects of the systems described in U.S. Publication Nos. US-2019-0258131 and/or US-2019-0047475, which are hereby incorporated herein by reference in their entireties.

Optionally, an ambient light sensor 24' may be disposed at or behind a light collecting lens 25 that is disposed along a lower portion of the mirror head, such as across the bottom region of a forward portion of the mirror casing. By providing a larger light receiving area that spans across the mirror head, with the light collecting lens 25 receiving light incident thereat and providing it to the sensor, the sensor 24' provides sufficient ambient light sensing even if components and darkening or hiding layers are disposed at the windshield that partially occlude the sensor. For example, see lines 26, which indicate a potential sensing field of view for the ambient light sensor 24' behind the light collecting lens 25. Although the sensing field of view is at least partially blocked by the windshield electronics module 28, the light collecting lens 25 and/or larger receiving area spanning across the mirror head allow the ambient light sensor 24' to receive enough light to properly sense the ambient light at the windshield and control dimming of the mirror reflective element. The light collecting lens 25 extends substantially entirely across the forward lower portion of the mirror head (and may partially wrap around the side lower portions of the mirror head) and thus provides more exposure area to forward light for the sensor. The sensor 24' may be centrally located at a center region of the light collecting lens, which may be centrally located at the forward lower region of the mirror casing or may be offset toward one side or the other of the mirror casing. Optionally, when the ambient light sensor 24' is not operating to sense ambient light, the light collecting lens may be used as a light emitting indicator (via activation of one or more light emitting diodes (LEDs) disposed in the mirror head and behind the lens), such as by utilizing aspects of the systems described in U.S. patent application Ser. No. 16/949,382, filed Oct. 28, 2020, now U.S. Pat. No. 11,318,888, issued as 11,318,888, which is hereby incorporated herein by reference in its entirety.

The light emitting indicator may display the status of one or more systems of the vehicle for viewing by a user exterior the vehicle through the windshield. For example, in electric vehicle applications, with the vehicle off and a battery of the vehicle charging, the light emitting indicator may provide a battery charging indicator so that a person outside of the vehicle can view the charging status of the vehicle via the indicator light through the windshield of the vehicle. The light emitting indicator may display the status automatically (such as upon receiving a charging device at a charging port of the vehicle) or responsive to an input (such as a user input at a key fob of the vehicle). The light emitting indicator may be used to display any variety of statuses or messages (such as via displayed text). For example, the light emitting indicator may be used to signal whether the vehicle is occupied or unoccupied or the name of a passenger the vehicle is intended to pick up (such as for taxi or public transportation applications).

Therefore, the interior rearview mirror system provides for ambient light determination via a remote sensor or a sensor with a light receiving or collecting lens that extends substantially across or along the lower region of the mirror head. The sensor remote from the mirror head provides ambient light sensing at an area that is not often blocked or occluded by components (such as a forward viewing camera module or windshield electronics module and/or the like) and darkening layers disposed at the in-cabin side of the windshield at or near the location where the interior rearview mirror assembly is mounted. A sensor behind a light collecting lens at a lower portion of the mirror head with an extended light receiving lens increases the ambient light collected when the collection area near the mirror head is blocked or occluded by components and darkening layers disposed at the in-cabin side of the windshield. When the sensor behind the light collecting lens is not being used to sense the ambient light at the windshield, the light collecting lens is used as a light emitting indicator via one or more LEDs disposed behind the lens.

The rain sensor unit located on the windshield could be the controller or ECU for driving the interior auto-dimming mirror based at least partially on ambient light information from the rain sensor and on glare information from a rearward viewing camera, such as the vehicle's rear backup camera or the like (such as by utilizing aspects of the dimming control systems described in U.S. Publication Nos. US-2019-0258131; US-2019-0047475 and/or US-2012-0236388, and/or U.S. patent application Ser. No. 17/248,736, filed Feb. 5, 2021, now U.S. Pat. No. 11,242,008, which are all hereby incorporated herein by reference in their entireties). Such a configuration provides auto-dimming control using a sensor, controller and camera that are part of the vehicle, such that no additional sensors and processors are required to provide the auto-dimming mirror. Optionally, the auto-dimming ECU control could be from other locations such as an overhead control unit of the vehicle, a door control unit of the vehicle, a seat control unit of the vehicle, a head unit of the vehicle and/or the like. The auto-dimming ECU control unit may control dimming of the mirror responsive to processing of image data captured by the rear backup camera and/or ambient light levels sensed by one or more light sensors at the vehicle.

Another advantage achieved by utilizing the additional "rain or light sensor" over the LIN or CAN bus or the like is that the sensor can determine ambient light even in situations where there is blockage from consumer objects hanging from the inside mirror. In such situations, the objects do not affect the light level determination. The additional light data over a bus or the like could be used as additional information to an algorithm that utilizes the existing ambient light sensor (of the rain light sensor) and the glare sensor located in the mirror (or a rearward viewing camera), such as to output dimming instructions for the reflective element.

Optionally, the mirror system may utilize some of the other available signals from the sensor, such as, for example, ambient temperature, windshield glass temperature, humidity, rain/precipitation, etc., and may adjust specific performance items to enhance operation of and/or protect the electronic accessory or system. For example, the system may limit EC dimming or darkening at extreme high temperatures (which could be detrimental to the EC cell), or may limit display brightness depending on determined temperatures to avoid thermal degradation (if used on a full mirror display system or mirror reflective element with integrated display). The system may also provide a day/night brightness control (which should be synchronized with the vehicle lighting since it may also be using the same signal). The system may operate in a rain mode (which could activate a camera obstruction monitor or occlusion monitor, or which could increase the sensitivity of the camera when precipitation is detected), and/or may limit operation or performance parameters of other electronic accessories or systems to protect the electronic accessories or systems, such as when temperature extremes are detected or changes in or high or low threshold levels of light are determined.

Optionally, ambient light data may be obtained or determined or estimated based on the current geographical location of the vehicle and the current time and weather conditions at that location. For example, a GPS system of the vehicle may determine the current geographical location of the vehicle, and the system may know the current time of day at that location and may receive data pertaining to the weather conditions at that location. Based on the time of day and current weather conditions, the system may determine or estimate the ambient light at that location at that time (such as based on a known sunrise and sunset time or weather forecast) and use the estimated ambient light value when controlling dimming of the mirror reflective element (in conjunction with the glare light data obtained from an output of a glare light sensor).

The mirror head may comprise a low profile mirror head or caseless mirror head, and may utilize aspects of the mirror assemblies described in U.S. Publication Nos. US-2019-0258131; US-2019-0047475 and/or US-2015-0334354, which are hereby incorporated herein by reference in their entireties. The mirror assembly may include indicators or displays of the types described in U.S. Pat. Nos. 9,126,525 and/or 5,530,240 and/or U.S. Publication No. US-2019-0106059, which are hereby incorporated herein by reference in their entireties.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

The mirror assembly may utilize aspects of the mirror assemblies described in U.S. Pat. Nos. 7,626,749; 7,338,177; 7,289,037; 7,274,501; 7,255,451; 7,249,860; 7,195,381; 7,184,190; 6,690,268; 6,501,387; 6,449,082; 6,439,755; 5,253,109; 5,151,816; 5,140,455 and/or 5,066,112, which are hereby incorporated herein by reference in their entireties.

The mirror assembly may provide intelligent dimming to control the display intensity using camera lux information, and may utilize floating pogo pins between the backlighting FPC and the EC cell (such as by utilizing aspects of the mirror assemblies and electrical connectors described in U.S. Pat. Nos. 10,484,587; 10,466,563; 9,878,669 and/or 9,565,342, which are hereby incorporated herein by reference in their entireties).

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror system, the vehicular interior rearview mirror system comprising:
   an interior rearview mirror assembly comprising a mirror head adjustably mounted at a mounting structure attached at an interior portion of a vehicle equipped with the vehicular interior rearview mirror system;
   wherein the mirror head comprises a mirror casing and a mirror reflective element;
   wherein the mirror reflective element comprises an electro-optic variable reflectance mirror reflective element;
   a glare light sensor that senses glare light emanating from headlights of another vehicle rearward of the equipped vehicle;
   mirror control circuitry operable to adjust dimming of the mirror reflective element responsive to an output from the glare light sensor and a determination of a level of ambient light at the equipped vehicle;
   wherein determination of the level of ambient light at the equipped vehicle is based in part ons a current geographical location of the equipped vehicle as determined by a global positioning system of the equipped vehicle and (ii) a determined weather condition at the current geographical location of the equipped vehicle as determined based on a weather forecast received at the equipped vehicle; and
   wherein, with the mirror head adjustably mounted at the interior portion of the equipped vehicle via the mounting structure, and responsive to the output from the glare light sensor and the determination of the level of ambient light at the equipped vehicle, the mirror control circuitry controls dimming of the mirror reflective element.

2. The vehicular interior rearview mirror system of claim 1, wherein the determination of the level of ambient light at the equipped vehicle is communicated to the mirror control circuitry via a communication network of the equipped vehicle.

3. The vehicular interior rearview mirror system of claim 2, wherein the communication network comprises a Local Interconnect Network (LIN) bus of the equipped vehicle.

4. The vehicular interior rearview mirror system of claim 1, wherein determination of the level of ambient light at the equipped vehicle is further based in part on a current time of day.

5. The vehicular interior rearview mirror system of claim 1, wherein the interior rearview mirror assembly comprises a video display screen operable to display video images representative of a view rearward of the equipped vehicle.

6. The vehicular interior rearview mirror system of claim 5, wherein display control circuitry is operable to adjust brightness of the video display screen at least in part responsive to the determination of the level of ambient light at the equipped vehicle.

7. The vehicular interior rearview mirror system of claim 1, wherein the glare light sensor comprises a rearward viewing camera of the equipped vehicle, and wherein glare light is determined via processing of image data captured by the rearward viewing camera.

8. A vehicular interior rearview mirror system, the vehicular interior rearview mirror system comprising:
   an interior rearview mirror assembly comprising a mirror head adjustably mounted at a mounting structure attached at an interior portion of a vehicle equipped with the vehicular interior rearview mirror system;
   wherein the mirror head comprises a mirror casing and a mirror reflective element;
   wherein the mirror reflective element comprises an electro-optic variable reflectance mirror reflective element;
   a glare light sensor that senses glare light emanating from headlights of another vehicle rearward of the equipped vehicle;
   an ambient light sensor that senses ambient light at the equipped vehicle;
   wherein the ambient light sensor is disposed behind a light collecting lens that is disposed at least partially across a lower region of the mirror casing;
   wherein the ambient light sensor senses ambient light at the equipped vehicle based on light incident at the light collecting lens;
   mirror control circuitry operable to adjust dimming of the mirror reflective element responsive to an output from the glare light sensor and an output from the ambient light sensor;
   wherein, with the mirror head adjustably mounted at the interior portion of the equipped vehicle via the mounting structure, and responsive to the output from the glare light sensor and the output from the ambient light sensor, the mirror control circuitry controls dimming of the mirror reflective element;

wherein the light collecting lens functions as a visible indicator that is viewable at least when an indicator light source at the mirror head and behind the light collecting lens is actuated; and wherein, when the indicator light source is energized, the indicator light source emits light that passes through the light collecting lens and that is viewable at the light collecting lens and exterior the mirror head.

9. The vehicular interior rearview mirror system of claim 8, wherein the indicator light source is energized responsive to a signal indicative of a status of an accessory of the equipped vehicle.

10. The vehicular interior rearview mirror system of claim 9, wherein the indicator light source comprises a plurality of light emitting diodes (LEDs) that are independently energized responsive to the signal indicative of the status of the accessory of the equipped vehicle.

11. The vehicular interior rearview mirror system of claim 8, wherein the light collecting lens is disposed entirely across the lower region of the mirror casing.

12. The vehicular interior rearview mirror system of claim 8, wherein the ambient light sensor is centrally located behind the light collecting lens.

13. The vehicular interior rearview mirror system of claim 8, wherein the mirror control circuitry controls dimming of the mirror reflective element in part responsive to determination of a level of ambient light at the equipped vehicle, and wherein determination of the level of ambient light at the equipped vehicle is based in part on (i) a current geographical location of the equipped vehicle as determined by a global positioning system of the equipped vehicle, (ii) a current time of day and (iii) a determined weather condition at the equipped vehicle.

14. The vehicular interior rearview mirror system of claim 8, wherein the interior rearview mirror assembly comprises a video display screen operable to display video images representative of a view rearward of the equipped vehicle.

15. The vehicular interior rearview mirror system of claim 14, wherein display control circuitry is operable to adjust brightness of the video display screen at least in part responsive to the output from the ambient light sensor.

16. The vehicular interior rearview mirror system of claim 8, wherein the glare light sensor comprises a rearward viewing camera of the equipped vehicle, and wherein glare light is determined via processing of image data captured by the rearward viewing camera.

17. The vehicular interior rearview mirror system of claim 8, wherein, when the indicator light source is energized, the mirror control circuitry does not control dimming of the mirror reflective element based on the output from the ambient light sensor.

18. A vehicular interior rearview mirror system, the vehicular interior rearview mirror system comprising:

an interior rearview mirror assembly comprising a mirror head adjustably mounted at a mounting structure attached at an interior portion of a vehicle equipped with the vehicular interior rearview mirror system;

wherein the mirror head comprises a mirror casing and a mirror reflective element;

wherein the mirror reflective element comprises an electro-optic variable reflectance mirror reflective element;

a glare light sensor that senses glare light emanating from headlights of another vehicle rearward of the equipped vehicle, wherein the glare light sensor comprises a rearward viewing camera of the equipped vehicle, and wherein glare light is determined via processing of image data captured by the rearward viewing camera;

an ambient light sensor that senses ambient light at the equipped vehicle;

wherein the ambient light sensor is disposed behind a light collecting lens that is disposed at least partially across a lower region of the mirror casing;

wherein the ambient light sensor senses ambient light at the equipped vehicle based on light incident at the light collecting lens;

mirror control circuitry operable to adjust dimming of the mirror reflective element responsive to an output from the glare light sensor and an output from the ambient light sensor;

wherein, with the mirror head adjustably mounted at the interior portion of the equipped vehicle via the mounting structure, and responsive to the output from the glare light sensor and the output from the ambient light sensor, the mirror control circuitry controls dimming of the mirror reflective element;

wherein the light collecting lens functions as a visible indicator that is viewable at least when an indicator light source at the mirror head and behind the light collecting lens is actuated, and wherein the indicator light source is energized responsive to a signal indicative of a status of an accessory of the equipped vehicle; and wherein, when the indicator light source is energized, the indicator light source emits light that passes through the light collecting lens and that is viewable at the light collecting lens and exterior the mirror head.

19. The vehicular interior rearview mirror system of claim 18, wherein the indicator light source comprises a plurality of light emitting diodes (LEDs) that are independently energized responsive to the signal indicative of the status of the accessory of the equipped vehicle.

20. The vehicular interior rearview mirror system of claim 18, wherein the mirror control circuitry controls dimming of the mirror reflective element in part responsive to determination of a level of ambient light at the equipped vehicle, and wherein determination of the level of ambient light at the equipped vehicle is based in part on (i) a current geographical location of the equipped vehicle as determined by a global positioning system of the equipped vehicle, (ii) a current time of day and (iii) a determined weather condition at the equipped vehicle.

21. The vehicular interior rearview mirror system of claim 18, wherein the interior rearview mirror assembly comprises a video display screen operable to display video images representative of a view rearward of the equipped vehicle.

22. The vehicular interior rearview mirror system of claim 21, wherein display control circuitry is operable to adjust brightness of the video display screen at least in part responsive to the output from the ambient light sensor.

23. The vehicular interior rearview mirror system of claim 18, wherein, when the indicator light source is energized, the mirror control circuitry does not control dimming of the mirror reflective element based on the output from the ambient light sensor.

* * * * *

UNITED STATES PATENT AND TRADEMARK OFFICE
CERTIFICATE OF CORRECTION

PATENT NO. : 12,012,043 B2
APPLICATION NO. : 17/301774
DATED : June 18, 2024
INVENTOR(S) : Austin T. Buerkle et al.

It is certified that error appears in the above-identified patent and that said Letters Patent is hereby corrected as shown below:

In the Claims

<u>Column 7</u>
Claim 1, Line 66, "in part ons a" should be --in part on (i) a--

Signed and Sealed this
Sixteenth Day of July, 2024

*Katherine Kelly Vidal*
Katherine Kelly Vidal
*Director of the United States Patent and Trademark Office*